United States Patent
Huber

(10) Patent No.: US 7,297,935 B2
(45) Date of Patent: Nov. 20, 2007

(54) POSITION-MEASURING DEVICE

(75) Inventor: Walter Huber, Traunstein (DE)

(73) Assignee: Dr. Johnannes Heidenhain GmbH, Traunreut (DE)

( * ) Notice: Subject to any disclaimer, the term of this patent is extended or adjusted under 35 U.S.C. 154(b) by 28 days.

(21) Appl. No.: 11/182,410

(22) Filed: Jul. 15, 2005

(65) Prior Publication Data
US 2006/0033020 A1 Feb. 16, 2006

(30) Foreign Application Priority Data
Jul. 16, 2004 (DE) .............. 10 2004 035 172

(51) Int. Cl.
G01D 5/34 (2006.01)
G01D 5/38 (2006.01)
(52) U.S. Cl. .................. 250/231.14; 250/231.16; 250/237 G
(58) Field of Classification Search ..............
250/231.13–231.18, 233, 237 G, 237 R, 250/221; G01D 5/34, 5/38
See application file for complete search history.

(56) References Cited

U.S. PATENT DOCUMENTS

| 4,912,322 | A | | 3/1990 | Ichikawa et al. | |
| 4,987,302 | A | * | 1/1991 | Meyer et al. | 250/231.14 |
| 5,428,445 | A | * | 6/1995 | Holzapfel | 356/499 |
| 5,471,054 | A | * | 11/1995 | Watanabe | 250/231.13 |
| 5,739,911 | A | | 4/1998 | Holzapfel et al. | |
| 5,994,692 | A | | 11/1999 | Holzapfel | |
| 6,359,691 | B2 | * | 3/2002 | Parriaux | 356/499 |
| 6,541,761 | B1 | | 4/2003 | Holzapfel et al. | |
| 6,552,810 | B1 | | 4/2003 | Hermann et al. | |
| 6,612,048 | B2 | * | 9/2003 | Peterlechner et al. | 33/755 |
| 6,713,756 | B2 | * | 3/2004 | Yamamoto et al. | 250/231.13 |
| 2002/0153479 | A1 | * | 10/2002 | Kenjo et al. | 250/231.14 |
| 2005/0061961 | A1 | * | 3/2005 | Tondorf et al. | 250/231.13 |
| 2005/0116153 | A1 | * | 6/2005 | Hataguchi et al. | 250/231.13 |

FOREIGN PATENT DOCUMENTS

| EP | 1 028 309 | 8/2000 |
| EP | 1 081 457 | 3/2001 |
| EP | 0 754 933 | 12/2001 |
| WO | WO 200138828 A1 * | 5/2001 |

* cited by examiner

Primary Examiner—Georgia Epps
Assistant Examiner—Christopher M Yealy
(74) Attorney, Agent, or Firm—Kenyon & Kenyon LLP

(57) ABSTRACT

A position-measuring device includes: a measuring graduation provided on a measuring standard device arranged around in ring-like fashion; a scanning unit for optically scanning the measuring graduation using electromagnetic radiation; a scanning plate with a scanning graduation, formed by a scanning grating, extending along a detection axis, which is arranged in the beam path of the electromagnetic radiation used for scanning the measuring graduation, so that the radiation interacts both with the scanning graduation and with the measuring graduation; and a detector of the scanning unit, whose detector surface is used for detecting the electromagnetic radiation after interaction with the scanning graduation and the measuring graduation and which is present as a stripe pattern, in order to record motions of the measuring standard device relative to the scanning unit. The grating constant of scanning graduation varies along the axis of extension of the scanning graduation such that the distances on which the phase of the stripe pattern present at the detector surface extends through a change by $2\pi$, are constant.

30 Claims, 5 Drawing Sheets

POSITION-MEASURING DEVICE

CROSS-REFERENCE TO RELATED APPLICATIONS

The present application claims priority to Application No. 10 2004 035 172.4, filed in the Federal Republic of Germany on Jul. 16, 2004, which is expressly incorporated herein in its entirety by reference thereto.

FIELD OF THE INVENTION

The present invention relates to a position-measuring device.

BACKGROUND INFORMATION

Such a position-measuring device for determining the relative position of two objects movable relative to each other (by a rotating motion) along a measuring direction (an angular position measuring device) includes: a periodic measuring graduation configured on a ring-like measuring standard device, e.g., in the form of a measuring strip; a scanning unit for optically scanning the measuring graduation using electromagnetic radiation (e.g., using light) which is generated in an illumination device (light source) of the scanning unit, the measuring standard device and the scanning unit being movable relative to each other along the measuring direction; a scanning plate of the scanning unit having a scanning graduation extending along an axis, that is formed by a scanning grating, which is arranged in the beam path of the electromagnetic radiation used for scanning the measuring graduation, so that this electromagnetic radiation interacts both with the scanning graduation and with the measuring graduation; and a detector of the scanning unit, the detector surface of which is used for detecting an intensity distribution of the electromagnetic radiation that is present as a stripe pattern, after interaction with the scanning graduation and the measuring graduation, so as to be able to record a relative motion of the measuring graduation with respect to the scanning device, from the change of the position-dependent phase of the intensity distribution.

By furnishing one of the two objects, whose relative motion is to be determined using the position measuring device, with the measuring graduation, and the other object with the scanning device, from the recording of the relative motion of the scanning device with respect to the measuring graduation, one may directly draw conclusions on the relative motion of the two objects to each other.

The measuring principle on which the aforesaid position-measuring device is based is described, for example, in European Published Patent Application No. 1 081 457, European Published Patent Application No. 1 028 309 and European Published Patent Application No. 0 754 933. European Published Patent Application No. 1 028 309 describes an optical position-measuring device for determining the relative position of two objects movable relative to each other along a measuring direction. This includes at least one periodic measuring graduation connected to one of the two objects, as well as a scanning unit connected to the other object and therefore movable relative to the measuring graduation along the measuring direction. The scanning unit has a light source, at least one scanning graduation, as well as a detector system in a detector plane that is made up of a plurality of radiation-sensitive detectors arranged one after the other in the measuring direction.

If, in a position-measuring device, a measuring strip used as the carrier of the measuring graduation is arranged in ring-like fashion, particularly by applying the measuring strip on a cylindrical body in the form of a drum, the position-measuring device may then be used for angular measurement. Alternatively, the respective measuring graduation may, for this purpose, also be applied directly on the drum itself, so that then the drum surface furnished with the measuring graduation directly forms the ring-like circumferential measuring standard device.

In the following, when using the term "measuring strip," provided it is not geared to a measuring strip of finite thickness, the intention is in each case also to include the limiting case in which the thickness of the measuring strip tends to zero: This limiting case corresponds to a situation in which the measuring graduation is applied directly on the (e.g., cylindrical) body (e.g., in the form of a drum), which is otherwise used for accommodating the measuring strip.

Using such an arrangement, there may be the problem that the local graduation period, projected onto the plane of the scanning plate, of the periodic measuring graduation provided on the ring-like circumferential measuring standard device decreases toward the outside with growing distance from the apex of the drum. From this there comes about a mutual shifting, growing toward the outside, of the graduation marks of the scanning graduation on the one hand, and of the measuring graduation on the other hand, with regard to their optimal position that would occur in response to a linear periodic arrangement both of the measuring graduation and of the scanning graduation. The described deviations, that follow from the ring-like arrangement of the periodic measuring graduation, may lead to a deterioration in the degree of modulation of the scanning signal generated at the detector.

SUMMARY

According to an example embodiment of the present invention, a position-measuring device may be provided which, given a simple arrangement, may permit the combination of an annular measuring standard device and a scanning plate as well as an associated detector having a two-dimensional radiation-sensitive surface, at a good quality of the scanning signals that are to be evaluated.

According to an example embodiment of the present invention, the grating constant of the scanning graduation may vary, e.g., the local period of the scanning graduation, along the direction of extension of the scanning graduation, such that the distances, on which the phase of the intensity distribution present at the detector surface, e.g., of the stripe pattern generated by interference (e.g., along the measuring direction, along which the detector elements of the detector are arranged one after the other, and thus, e.g., also in parallel to the axis of extension of the scanning graduation) extends through a (e.g., linear) change by $2\pi$, are constant.

In other words, the phase (e.g., Vernier phase) in the detection plane defined by the detection surface of the detector, independently of at which location in the plane the change of the phase is examined, may increase, always within a predefined length or distance, linearly by $2\pi$ along (e.g., especially the so-called Vernier period).

The scanning graduation may provide that the degree of modulation, and consequently the signal amplitudes of the scanning signal, may be set in optimum fashion, since, for any diameter of the ring-like arranged measuring standard device, the local graduation period (e.g., grating constant) of the scanning graduation along the measuring direction, that, along the axis of extension of the scanning graduation, is determined such that the period intensity distribution, generated in the plane of the detector surface, of the electromagnetic radiation or of the stripe pattern (e.g., Vernier period) may always have the same constant value, with respect to the extension along the measuring direction. Thereby, it may be possible for any diameter of the ring-like circumferential measuring standard device, e.g., especially for any diameters of a drum, on which a measuring strip furnished with the measuring standard device, always to use the equally structured detector for detecting the electromagnetic radiation after interaction with the measuring graduation and the scanning graduation.

An example embodiment of the present invention may provide for an increased measuring accuracy in the case of contamination of the measuring graduation, since, in the scanning signals, as a result of contamination, no phase shifts but only different amplitudes may occur.

Example embodiment of the present invention, e.g., position-measuring devices in which a periodic, so-called Vernier stripe pattern is generated, may be used also in the case in which the period of the stripe pattern tends to infinity. A uniform bright/dark modulation is generated, having a constant phase on a scanning field.

In position-measuring devices in which the measuring graduation and the scanning graduation extend parallel to each other along a measuring direction, the first corresponds to an arrangement in which the scanning graduation and the measuring graduation have a different graduation period, while the borderline case of a uniform bright/dark modulation of a constant phase corresponds, in the linear case, to an identical graduation period of the measuring graduation on the one hand, and to the scanning graduation on the other hand.

The variation of the grating constant or the local period of the scanning graduation may be implemented, e.g., in that the grating constant of the scanning graduation, starting from a reference point, varies in at least one spatial direction along the axis of extension of the scanning graduation in a defined manner, e.g., continuously. This takes into account the reduction, described above, of the measuring graduation, projected on the scanning plate, along the axis of extension of the scanning graduation.

In this context, the arrangement may be of the kind that the grating constant of the scanning graduation, starting from the reference point, decreases, extending in two directions that are opposite to each other, in each case along the axis of extension of the scanning graduation (e.g., opposite to each other), and, e.g., symmetrically, that is, the decrease, starting from the reference point, is identical along the two spatial directions that are opposite to each other.

The position-dependent grating constant of the scanning graduation may be determined from a position-dependent grating phase of the scanning graduation, which is derived from the position-dependent grating phase of the measuring graduation that is projected onto the scanning plate, and a predefinable periodic phase of the intensity distribution that is present at the detector surface of the scanning unit.

From the position-dependent grating phase of the scanning graduation, then, the locus of the frequency distribution of the scanning graduation may be calculated, e.g., by deriving the position-dependent grating phase with respect to the location as well as dividing by $2\pi$. The position-dependent frequency distribution forms the inverse of the local grating constant or the local graduation period of the scanning graduation, so that this may be calculated directly from the frequency distribution by forming the inverse.

The detector surface of the detector of the scanning unit may be formed by a periodic arrangement of detector regions (e.g., along the axis of extension of the scanning graduation), whose period is tuned to the period of that stripe pattern for whose scanning the respective detector is configured and provided for the achievement of a maximum intensity of the electromagnetic radiation on the radiation-sensitive surface. In the case of a periodically structured detector, this means, e.g., that the radiation-sensitive surface of the detector has a period that agrees with the period of the stripe pattern up to an integral multiple.

In this context, by the period of the detector is not necessarily understood the period of the geometrical arrangement of the individual detector regions or detector elements. Rather, an electrical interconnection of the individual detector regions or detector elements should also be taken into account. Thus, in the case of a structured detector, it may be provided that four detector elements are arranged on a length which corresponds to the period of the stripe pattern received on the radiation-sensitive surface of the detector, each detector element being allocated to a certain phase value, e.g., to one of the phases 0°, 90°, 180°, 270°. In this context, a plurality of groups of four detectors each are arranged one after the other (e.g., along the axis of extension of the scanning graduation) from the individual detector groups, in each case those detector regions or detector elements being interconnected which are assigned to the same phase. The period of such a structured detector is in each case defined by the width of one detector group, respectively, that includes a plurality of detector regions, e.g., four detector regions.

When using a detector having a two-dimensional, planar, radiation-sensitive surface for scanning the measuring graduation on a measuring standard device going around in ring-like fashion, the detector extends at a defined (e.g., radial) distance from the measuring standard device surface provided with the measuring graduation, in a tangential direction (e.g., parallel to a tangent at the outer circumference of the measuring standard device that is arranged in ring-like fashion). Accordingly, in the case of a structured detector, the individual detector regions or detector elements are arranged one after the other along a direction parallel to a tangent to the ring-shaped measuring standard device.

In a corresponding manner, the scanning plate of the scanning unit is also positioned parallel to a tangent, at the outer circumference of the measuring standard device, that represents the measuring direction, and, e.g., of the kind that the scanning graduation of the scanning plate extends parallel to the detector surface of the detector. The detector may be tilted relative to the scanning plate about an axis extending in the measuring direction. However, then the scanning graduation and the arrangement of the detector elements also both extend in the measuring direction.

The location of the scanning graduation that is at the smallest distance from the measuring graduation, and which, thus, is directly opposite to the apex of the measuring graduation facing the scanning graduation, in this context forms the reference point, starting from which the grating constant of the scanning graduation is varied (e.g., symmetrically) in two directions opposite to each other, parallel to the axis of extension of the scanning graduation.

It should be appreciated that example embodiments of the present invention may not only be applied to the case in which the measuring graduation is provided on an outer surface (e.g., outer ring surface) of a measuring strip, but also in the case in which the measuring graduation is developed on the inner surface (e.g., inner ring surface) of the measuring strip.

Both the scanning graduation and the measuring graduation may be formed by so-called amplitude gratings that interact with electromagnetic radiation (e.g., light) such that—according to the period of the respective grating—a periodic sequence of brighter and darker light regions is generated. If the position-measuring device is operated in the so-called reflection method, then in each case markings (e.g., graduation marks) of greater and lesser reflectivity with regard to the electromagnetic radiation (e.g., light) used for the scanning are provided in the corresponding grating. In contrast, when using the so-called transmitted-light method, the markings (e.g., graduation marks), arranged periodically one after the other, differ in transmissivity for the electromagnetic radiation (e.g., light) used for the scanning.

In addition, the scanning graduation may also take the form of a so-called MAP grating (mixed amplitude phase grating) as illustrated, for example, in FIGS. 2a and 2b of European Published Patent Application No. 1 081 457. The calculation of the grating phase of the amplitude grating is described further below, with reference to an exemplary embodiment. Alternatively, the scanning graduation may also be formed by a phase grating. Whether an amplitude grating, a phase grating or a mixed amplitude/phase grating (MAP grating) is used depends on the respective configuration of the measuring system. In this context, the tolerable signal amplitudes, the tolerance with respect the scanning spacing and costs may be more or less important.

Collimated (e.g., parallelized) electromagnetic radiation in the form of light may be used for scanning the measuring strip.

According to an example embodiment of the present invention, a position-measuring device includes: a measuring graduation arranged around a measuring standard device in a ring manner; and a scanning unit adapted to optically scan the measuring graduation with electromagnetic radiation, the scanning unit including a scanning plate having a scanning graduation formed by a scanning grating extending along an axis of detection that is arranged in a beam path of the electromagnetic radiation so that the electromagnetic radiation interacts with the scanning graduation and the measuring graduation, the scanning unit including a detector having a detector surface adapted to detect electromagnetic radiation present after the interaction with the scanning graduation and the measuring graduation to record motions of the measuring standard device relative to the scanning unit. A grating constant of the scanning graduation decreases in at least one spatial direction along an axis of extension of the scanning graduation starting from a reference point.

The grating constant of the scanning graduation, along the axis of extension of the scanning graduation, may vary such that distances, on which a phase of an intensity distribution of the electromagnetic radiation that is present at the detector surface in a stripe pattern changes by $2\pi$, are constant.

The grating constant of the scanning graduation may decrease in two spatial directions that are opposite to one another and extend along the axis of extension of the scanning graduation starting from a reference point.

The decrease of the grating constant of the scanning graduation along the two opposite directions may be symmetric with respect to the reference point.

A position-dependent grating constant of the scanning graduation may be dependent on a position dependence of a grating phase of the scanning graduation, which may be derived from a position-dependent grating phase of the measuring graduation, projected onto the axis of extension of the scanning graduation, and from a prespecifiable position-dependent phase of a desired stripe pattern of the electromagnetic radiation at the detector surface.

The position-dependent grating constant of the scanning graduation may correspond to an inverse of the frequency distribution:

$$g_A(x) := \frac{1}{2\cdot\pi} \cdot \frac{d}{dx}\phi(x)$$

in which $\phi(x)$ represents the position-dependent phase at the scanning graduation.

The detector surface of the detector may include a periodic arrangement of detector regions arranged one after the other along a detector axis, and a period of the periodic arrangement may be tuned to a period of a stripe pattern to be detected by the detector.

The detector regions may include detector elements, e.g., photosensors.

The detector may include a planar, substantially two-dimensional detector surface.

At least one of (a) the measuring graduation and (b) the scanning graduation may include an amplitude grating.

The scanning graduation may include a MAP grating.

The electromagnetic radiation may include collimated light.

The measuring graduation may be arranged on a measuring strip arranged in ring fashion on a rotatable drum.

The measuring graduation may be arranged directly on a surface of a rotatable drum.

Other features and aspects hereof are described below with reference to the appended Figures.

DETAILED DESCRIPTION

Figure 1A:
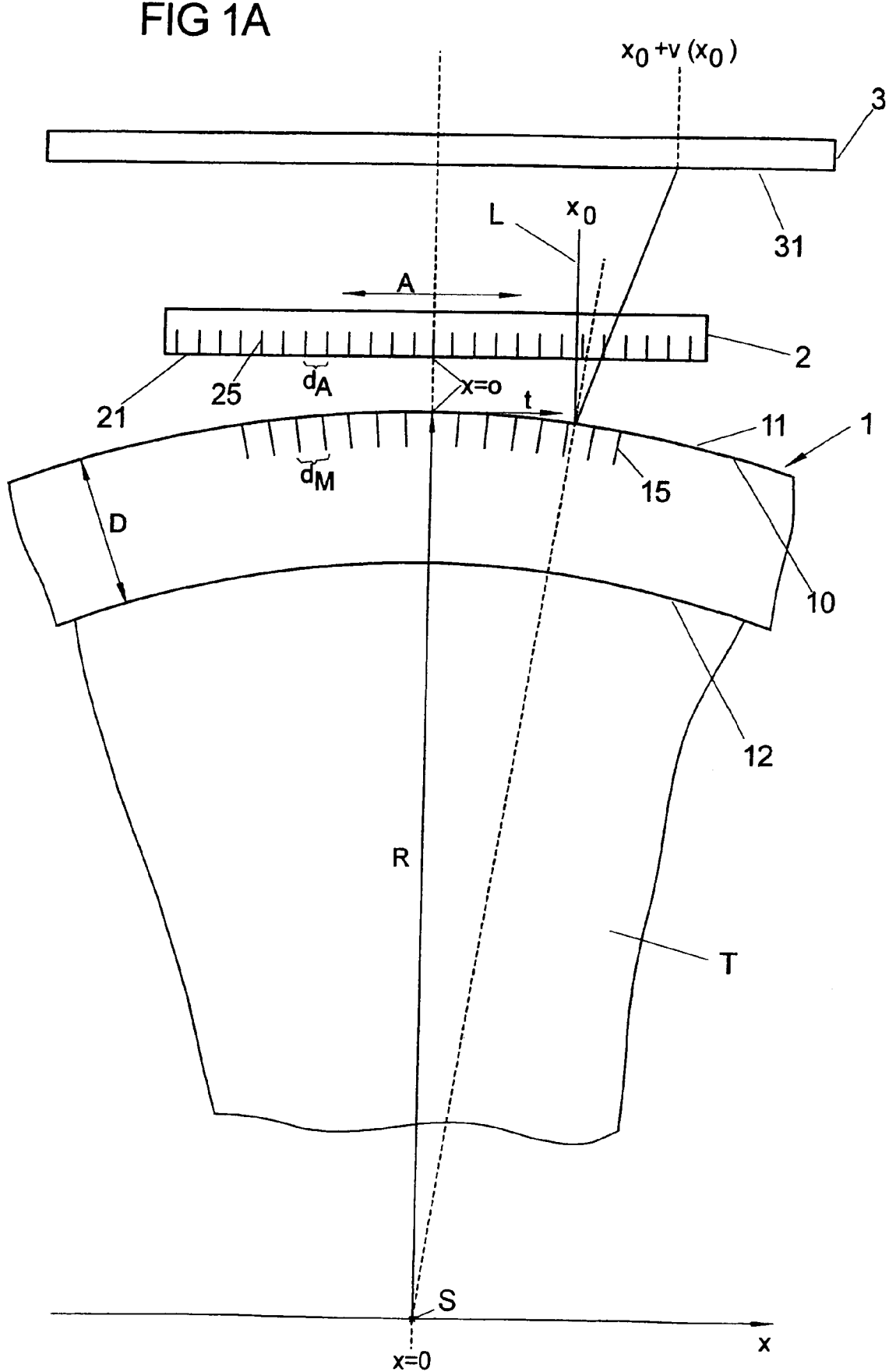
FIG. 1A is a schematic view of a section of a measuring strip, arranged in the shape of a ring, having a periodic measuring graduation, as well as an allocated scanning unit having a scanning plate and a detector.

FIG. 1A schematically illustrates a position-measuring device for angular measurement having a measuring strip 1 of finite thickness arranged in the shape of a ring along a circular arc, and having a scanning unit which includes a light source, a scanning plate 2 and a detector 3 in the form of a photodetector.

Measuring strip 1 and scanning unit 2, 3 are movable relative to one another, e.g., in that measuring strip 1 is affixed to the outer periphery of a drum T that is rotatable about an axis S, and scanning unit 2, 3 is arranged in a stationary manner in front of the outer surface (e.g., outer ring surface) of measuring strip 1, (e.g., and set apart from it in the radial direction).

Measuring strip 1, arranged in the shape of a ring along a circular arc 10 having radius R, has an outer ring surface 11 provided with a periodic measuring graduation 15 in the form of a line graduation, as well as an inner surface 12 (e.g., inner ring surface). Alternatively, periodic measuring graduation 15 may also be provided directly on the outer surface of drum T that is rotatable about axis S. The outer surface of the drum forms annular surface 11, on which measuring graduation 15 is provided.

A scanning plate 2, allocated to measuring strip 1, of scanning unit 2, 3 is arranged in front of outer annular surface 11 of the measuring strip and at a distance from it, e.g., so that it extends parallel to a tangent t at outer annular surface 11 of measuring strip 1. Since measuring strip 1 has a certain expansion perpendicular to the ring plane, e.g., perpendicular to the drawing plane of FIG. 1A, tangent t not simply a straight line is involved, but rather a tangential plane.

Scanning plate 2 is provided on its surface 21, facing outer annular surface 11 of measuring strip 1, with a scanning graduation 25. Surface 21 of scanning plate 2 facing outer ring surface 11, as well as scanning graduation 25 formed there, each extend along an axis A parallel to tangent t at outer ring surface 11 of measuring strip 1.

Figure 1B:
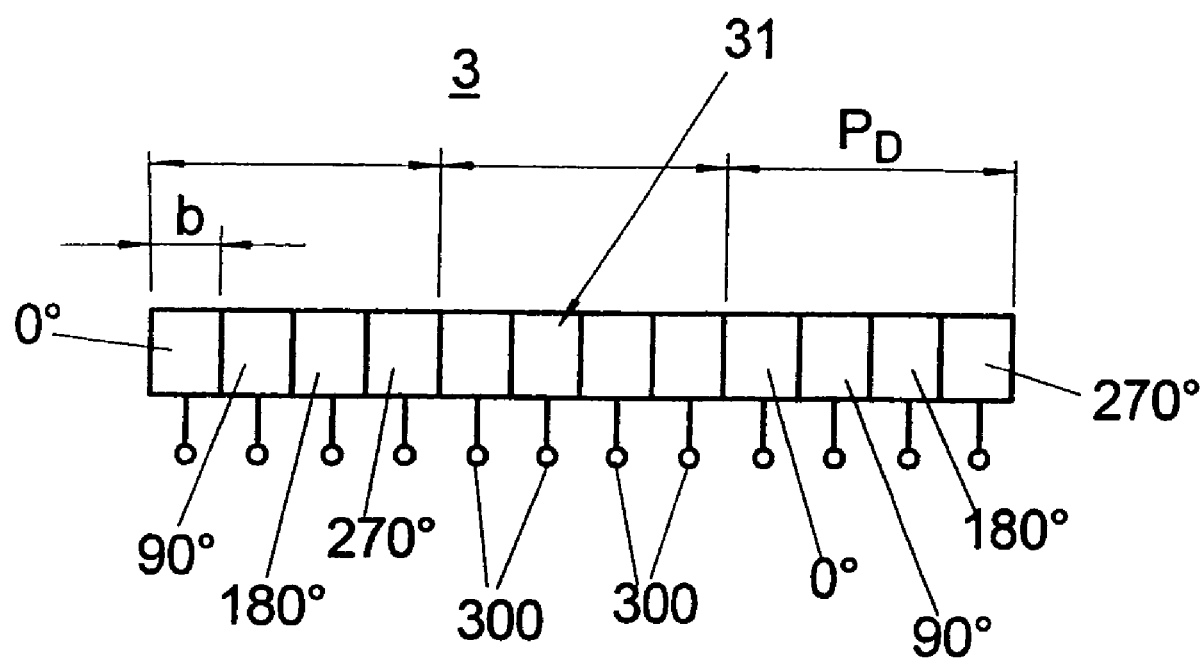
FIG. 1B is a schematic view of a radiation-sensitive surface of a structured detector of a scanning unit illustrated in FIG. 1A.

Viewed from measuring strip 1, a detector 3, a so-called structured photodetector, having a radiation-sensitive surface 31 is arranged behind scanning plate 2. As illustrated in FIG. 1B, its radiation-sensitive surface is formed by a plurality of detector elements in the form of photosensors arranged one after the other and having a width b. In this context, the direction along which the detector elements are arranged one after the other corresponds to axis of extension A of scanning graduation 25 of FIG. 1A. This means that scanning graduation 25 of scanning plate 2, as well as detector elements of detector 3 that are arranged one behind another, extend parallel to one another, e.g., parallel to axis of extension A, which extends parallel to tangent t at outer annular surface 11 of measuring strip 1, and which corresponds to the measuring direction at scanning unit 2, 3.

In this context, in each case four detector elements of detector 3 form one detector group, and the four detector elements of one detector group are in each case allocated to one of the four phase values 0°, 90°, 180° and 270°. Consequently, period $P_D$ of this arrangement of detector elements corresponds to fourfold the width b of a single detector element of the phase values 0°, 90°, 180° or 270°. Also illustrated schematically in FIG. 1B are electrical connections 300 of the individual photosensors which form radiation-sensitive surface 31 of photodetector 3, photoelements of different detector groups and allocated to the same phase value 0° or 90° or 180° or 270° being interconnected, so that their output signals may be jointly supplied for evaluation to an evaluation unit.

FIG. 1B illustrates three detector groups of radiation-sensitive surface 31 of photodetector 3, each made up of four detector elements (e.g., photosensors) of the phase 0° or 90° or 180° or 270°. This is only a section of radiation-sensitive surface 31 of photodetector 3, which may have ten to fourteen such detector groups arranged periodically one after the other and each made up of four photosensors.

Scanning unit 2, 3 of the position-measuring device (e.g., angular measurement device), illustrated in FIGS. 1A and 1B, is used for the optical scanning of measuring graduation 15 on outer ring surface 11 of measuring strip 1 that is arranged ring-shaped along a circular arc section 10. To do this, outer ring surface 11 of measuring strip 1, that is provided with measuring graduation 15, may be irradiated in a conventional manner with collimated electromagnetic radiation L in the form of light, which is generated using a suitable illumination unit (e.g., light source), and has been collimated using a suitable condenser lens, such as is described in European Published Patent Application No. 1 081 457. Light L used for scanning measuring graduation 15 on outer ring surface 11 of measuring strip 1 interacts both with scanning graduation 25 of light-transmitting scanning plate 2, which may be arranged in a conventional manner in the beam path of light L, as well as with measuring graduation 15 on outer ring surface 11 of measuring strip 1, at which light L is reflected.

Light beams L, modified both by scanning graduation 25 and by measuring graduation 15, form on radiation-sensitive surface 31 of photodetector 3 a so-called Vernier stripe pattern having a period that is defined by grating constant $d_A$ of scanning graduation 25 and grating constant $d_M$ of measuring graduation 15. In the case of a position-independent grating constant, which, in the case at hand, is present, e.g., in the case of measuring graduation 15 of measuring strip 11, grating constant $d_M$ at the same time is equal to the period of the respective graduation.

The photosensors arranged on radiation-sensitive surface 31 of photodetector 3 generate an electrical signal, corresponding to this stripe pattern, which is supplied to an evaluation unit that, by evaluating the electrical output signals of photodetector 3, ascertains the extent of a relative movement between measuring strip 1 and scanning unit 2, 3.

Compared to a measuring graduation provided on a linear ruler, because of the ring-shaped arrangement of measuring graduation 15 along a circular path, there may be the problem that grating constant d(x) of measuring graduation 15, projected along the direction of collimated light beams L on facing surface 21 of scanning plate 2, varies. This is described in greater detail below, with reference to a coordinate axis x, which extends parallel to tangent t of outer ring surface 11 of measuring strip 1, as well as parallel to axis of extension A of scanning graduation 15 of scanning plate 2.

In this context, that point is marked x=0 at which outer ring surface 11 of measuring strip 1, and, consequently, measuring graduation 15 are at the smallest distance (e.g., in the radial direction R) from facing surface 21 of scanning plate 2, and, with that, scanning graduation 25. The point having coordinate x=0 is henceforth designated on measuring strip 1 as apex point and on scanning plate 2 as reference point.

In the context of FIG. 1A, it becomes clear that, in response to a projection of measuring graduation 15 on facing surface 21 of scanning graduation 2, grating constant d(x) of measuring graduation 15 projected onto the surface 21, starting from the reference point (x=0) of scanning plate 2 in opposite directions to each other x, −x (e.g., parallel to axis of extension A of scanning graduation 25) becomes steadily smaller, toward the outside (e.g., away from the reference point). Grating constant d(x) of measuring graduation 15, that is projected onto facing surface 21 of scanning plate 2, thus decreases continuously in each case, starting towards the outside, e.g., along opposite directions x, −x.

A problem involved with the ring-shaped arrangement of measuring graduation 15 may also be shown in the light of the reflection of collimated light beams L after its incidence on outer ring surface 11 of measuring strip 1.

As explained above, light beams L of a collimated radiation beam interact with scanning graduation 2, whereby an interference stripe pattern is generated in the curved plane of measuring graduation 15, that is arranged annularly. This radiation, characterized by an interference stripe pattern or an intensity pattern, scans measuring graduation 15, which is arranged as an amplitude or diffraction grating having equidistant graduation marks (e.g., a position-independent grating constant $d_M$). Because of the collaboration of scanning graduation 25 with drum graduation 15, a Vernier stripe pattern is created in the detection plane defined by radiation-sensitive surface 31 (e.g., detection surface) of detector 3, which is recorded by the detector elements of detector 3 that are configured as photosensors, and are evaluated in an allocated evaluation unit. In this context, a light beam L, which at one place penetrates scanning graduation 2 at coordinate $x_0$ and is subsequently reflected at outer ring surface 11 that is provided with measuring graduation 15, as seen illustratively, leads to a signal at radiation-sensitive surface 31 of detector 3, at a location $x_0+v(x_0)$, which has been shifted by a value $v(x_0)$ compared to the position that would occur in the case of a linear arrangement of measuring strip 11. The respective position-dependent shift $v(x)$ may be calculated for each position x from the geometric arrangement of the components of the measuring device described, with respect to one another.

The qualitative representation carried out above in the light of FIG. 1A may, in this context, only supply an illustrative representation of the problem which is connected to the projection effect discussed before that (as a result of the projection of measuring graduation 15 of measuring strip 1 onto facing surface 21 of scanning graduation 2). The undulatory nature of the light interacting with both graduations 15, 25 may have to be considered. This will be done below.

The result of the projection effect described above is in every case that, given an equidistant arrangement both of the graduation marks of measuring graduation 15 and of the graduation marks of scanning graduation 25, no stripe pattern (e.g., intensity pattern) of a constant period is generated at radiation-sensitive surface 31 of detector 3. This may lead to a loss in the signal amplitude of the scanning signals that are generated by detector 3 and that are to be supplied to an evaluation unit, if the radiation-sensitive surface 31 of detector 3 is formed in a conventional manner by a periodic arrangement of photosensors of the same width b (cf., FIG. 1B).

In order to address this disadvantage, on surface 21 of scanning plate 2 facing measuring graduation 15, a scanning graduation 25 may be provided that has a position-dependent scanning graduation $d_A$, the local, position-dependent grating graduation $d_A(x)$ of scanning graduation 25 being calculated such that the collaboration of measuring graduation 15 with scanning graduation 25 leads to a stripe pattern or an intensity pattern having a constant period, in the plane of radiation-sensitive surface 31 of detector 3. That means, as seen along axis of extension A of scanning graduation 25, a change of phase of the stripe pattern (e.g., Vernier phase) by $2\pi$ (e.g., Vernier period) in each case corresponds to one and the same distance along axis of extension A and the x axis of the coordinate system introduced in FIG. 1A.

When mentioning below position-dependent grating constant $d_A(x)$ of the scanning graduation, this grating constant refers first of all, for example, to an amplitude grating or a phase grating having a phase depth $\pi/2$. If a MAP grating or a phase grating having a phase depth $\pi$ is used, the following equation applies:

$$d_A(x)[\text{MAP-grating}]=d_A(x)[\text{phase grating having phase depth } \pi]=2 \cdot d_A(x)[\text{amplitude grating}]$$

The mathematical formulation of the calculation of the position dependence of grating constant $d_A(x)$ of scanning graduation 2 starts from the position dependence of position-dependent grating constant $d(x)$ of measuring graduation 15, that is projected onto facing surface 21 of scanning plate 2:

$$d(x) = d_M \cdot \left(1 + \frac{D}{2 \cdot R}\right)\left[1 - \frac{1}{2} \cdot \left(\frac{x}{R}\right)^2\right],$$

$d_M$ designating the position-independent grating constant (e.g., constant graduation period) of measuring graduation 15 directly on the measuring strip, and R giving the distance of the ring-shaped measuring strip device, e.g., the distance between outer ring surface 11 of measuring strip 1 and axis of rotation S of the drum as well as of measuring strip 1 that is arranged on it, and D representing the thickness of measuring strip 1.

The present mathematical derivation is based on a quadratic approximation which is believed to be quite sufficient for many applications. In other cases, one may have to calculate more exactly, e.g., using the dependence of the projected grating constants on the local angle of inclination of surface 21 according to a cosine function.

For the position-dependent grating phase of the projected measuring graduation, which is calculated as the integrated inverse of the position-dependent projected grating constant $d(x)$ of measuring graduation 15 multiplied by $2\pi$, one obtains:

$$\xi(x) = 2\pi \frac{1}{\left[d_M\left(1+\frac{D}{2 \cdot R}\right)\right]}\left[\int \frac{1}{1-\frac{1}{2} \cdot \left(\frac{x}{R}\right)^2} dx\right]$$

and, by carrying out the integration:

$$\xi(x) = 2 \cdot \frac{\pi}{d_M\left(1+\frac{1}{2} \cdot \frac{D}{R}\right)} \cdot R \cdot \sqrt{2} \cdot \text{artanh}\left(\frac{1}{2} \times \frac{\sqrt{2}}{R}\right).$$

Furthermore, it is assumed that, for Vernier period A of the Vernier stripe pattern generated on radiation-sensitive surface 31 (e.g., detector surface) of detector 3, a specific, predefinable value is striven for, which is derived from the periodicity of the arrangement of the detector elements (e.g., photosensors) of detector 3 illustrated in FIG. 1B. While stipulating a specific value for A, the position-dependent Vernier phase at radiation-sensitive surface 31 (e.g., detector surface) of detector 3 amounts to:

$$\Phi_V(x) = \frac{-2\cdot\pi}{\Lambda}\cdot\left[x+\left(z_S+\frac{x^2}{2\cdot R}\right)\cdot\tan\left(\frac{2\cdot x}{R}\right)\right],$$

where $Z_s$ denotes the perpendicular sensor distance at x=0, e.g., the shortest distance of detector 3 from measuring graduation 15.

From the above-mentioned position-dependent grating phase of measuring graduation 15 projected on facing surface 21 of scanning graduation 2, as well as from also above-mentioned position-dependent Vernier phase A (e.g., taking into consideration prespecified Vernier period A as well as prespecified sensor distance $Z_s$) of the Vernier stripe pattern present at radiation-sensitive surface 31 of detector 3, one obtains for the grating phase of the scanning graduation formed by an amplitude structure:

$$\phi(x)=\Phi_v(x)+\xi(x).$$

From this, one may calculate the so-called local frequency distribution of the amplitude structure of the scanning graduation as:

$$g_A(x) = \frac{1}{2\cdot\pi}\cdot\frac{d}{dx}\phi(x).$$

The inverse of this frequency distribution $g_A(x)$ gives the position-dependent grating constant $d_A(x)$ of the scanning graduation that is to be calculated.

Figure 2:
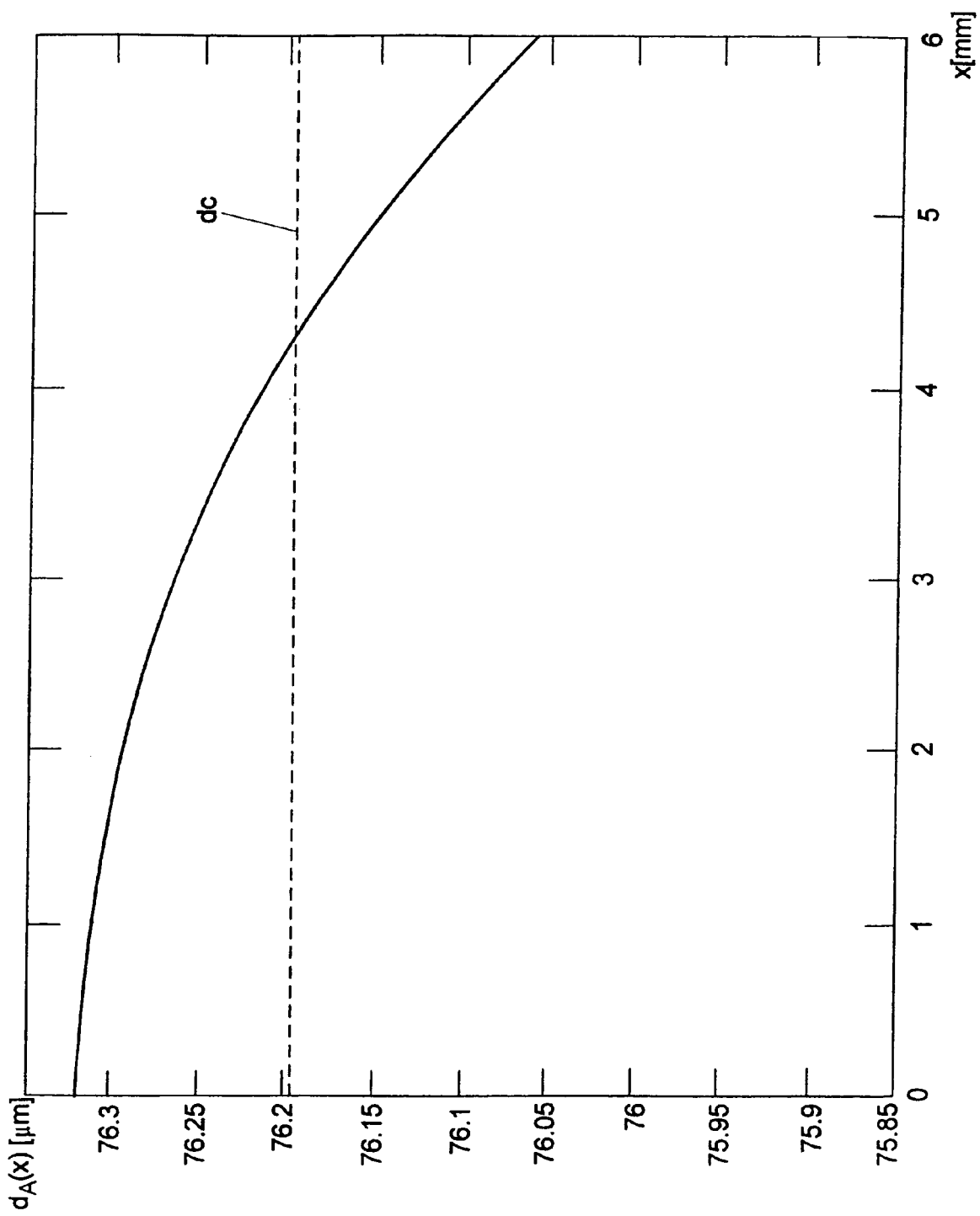
FIG. 2 is a graphic view of the position dependence of the grating constant of the scanning graduation provided on the scanning plate.

FIG. 2 illustrates position-dependent grating constant $d_A(x)$ of a scanning graduation in the form of a MAP grating as a function of distance x from the reference point of the scanning graduation, e.g., of that point at which the scanning graduation is at the smallest distance from the measuring graduation. According to the example illustrated, the measuring graduation is applied to a measuring strip which is set about a drum having a drum diameter of 40 mm, and it has a grating constant or period of 40 µm. Vernier wavelength A, in this case, amounts to 800 µm.

In the context of FIG. 2, it may be recognized that grating constant $d_A(x)$ of the MAP grating of the scanning graduation, in the form of a scanning grating, assumes its maximum value at the reference point, and then becomes less with increasing distance from the reference point. In the linear case, e.g., in the case of a linearly extending measuring graduation, instead of a measuring graduation that is set in a ring shape about a drum, the grating constant of the scanning graduation would be between the maximum and the minimum value, as is schematically indicated in FIG. 2 as dashed line $d_c$. The change of grating constant $d_A(x)$ along axis of extension A of scanning graduation amounts, in this context, to clearly less than 1% (e.g., even less than 0.5%) and consequently represents only a small correction of the basically periodic structure of the scanning graduation, so that, because of the small (e.g., continuous) variation of grating constant $d_A(x)$, at least one local period of the scanning graduation may be specified in the environment of each point x.

The drop in the grating constant from the reference point (e.g., null point), indicated in FIG. 2, applies for both directions along axis of extension A of scanning graduation in the same manner, e.g., both along positive direction +x and along opposite direction -x.

Figure 3A:
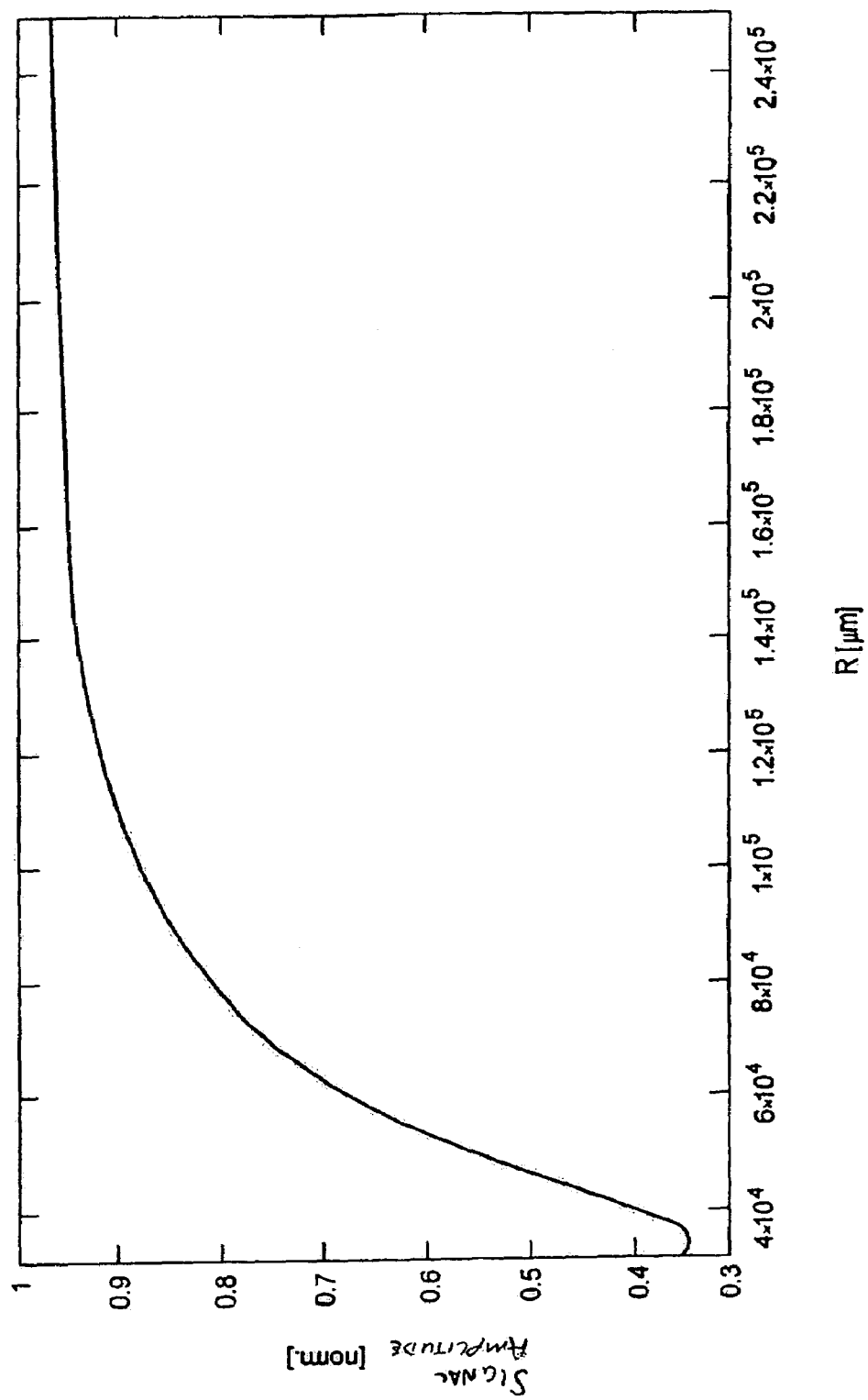
FIG. 3A illustrates the signal amplitude, normalized to a planar measuring strip, of the scanning signal of the structured detector as a function of the radius of the measuring strip arranged in ring shape, using an equidistant scanning graduation.

Without the position dependence of scanning constant of the scanning graduation that was quantitatively described above and illustrated graphically in FIG. 2, the Vernier period may vary at the detector surface of the detector with growing distance from that point having the smallest distance from the drum, with the result of a substantial reduction in the signal amplitude of the signal generated at the detector for small drum radii, as illustrated in FIG. 3A.

FIG. 3A illustrates the amplitude of the signals generated at the detector, normalized to 1 as the maximum value, that is derived using a planar measuring graduation, as a function of drum radius R at an equidistant scanning graduation, e.g., without the correction provided hereby (e.g., position dependence) of the grating constant. It then becomes clear that for drum radii of less than 100 mm the signal losses may be considerable.

Figure 3B:
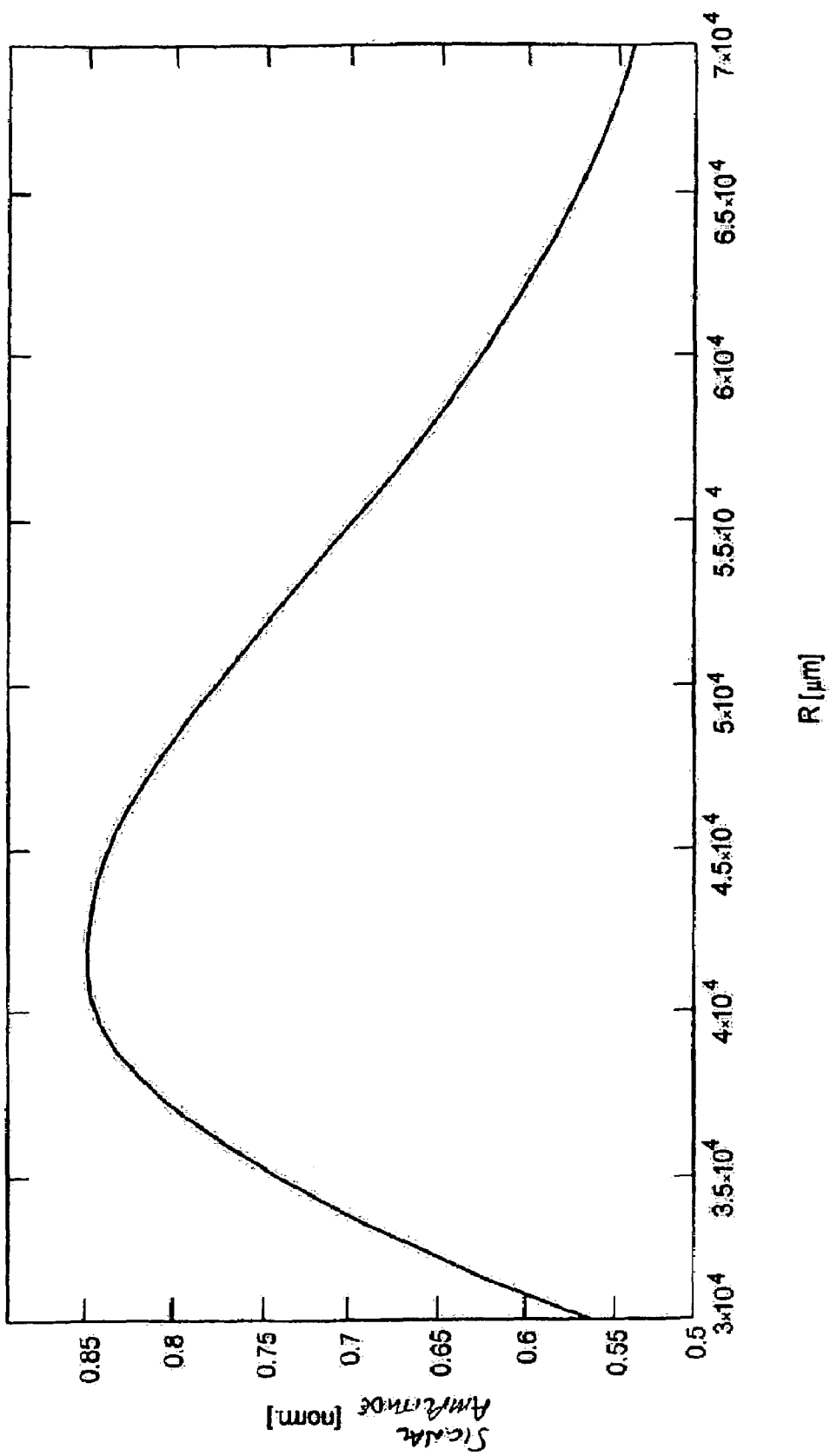
FIG. 3B illustrates the signal amplitude of the scanning signal of the structured detector, as a function of the radius of the measuring strip arranged in ring form, in response to the use of a scanning graduation having a position-dependent grating constant.

FIG. 3B illustrates the signal amplitude as a function of drum radius R in the case of an optimization of the grating constant of the scanning grating for a drum radius R=40 mm. In this instance, the signal amplitude has a maximum at exactly this drum radius R, and is at over 85% of the maximum possible signal amplitude.

What is claimed is:

1. A position-measuring device, comprising:
   a measuring graduation arranged around a measuring standard device in a ring manner; and
   a scanning unit adapted to optically scan the measuring graduation with electromagnetic radiation, the scanning unit including a scanning plate having a scanning graduation formed by a scanning grating extending along an axis of detection that is arranged in a beam path of the electromagnetic radiation so that the electromagnetic radiation interacts with the scanning graduation and the measuring graduation, the scanning unit including a detector having a detector surface adapted to detect electromagnetic radiation present after the interaction with the scanning graduation and the measuring graduation to record motions of the measuring standard device relative to the scanning unit;
   wherein a grating constant of the scanning graduation decreases in at least one spatial direction along an axis of extension of the scanning graduation starting from a reference point.

2. The position-measuring device according to claim 1, wherein the grating constant of the scanning graduation decreases in two spatial directions that are opposite to one another and extend along the axis of extension of the scanning graduation starting from a reference point.

3. The position-measuring device according to claim 2, wherein the decrease of the grating constant of the scanning graduation along the two opposite directions is symmetric with respect to the reference point.

4. The position-measuring device according to claim 1, wherein a position-dependent grating constant of the scanning graduation is dependent on a position dependence of a grating phase of the scanning graduation, which is derived from a position-dependent grating phase of the measuring graduation, projected onto the axis of extension of the scanning graduation, and from a prespecifiable position-dependent phase of a desired stripe pattern of the electromagnetic radiation at the detector surface.

5. The position-measuring device according to claim 4, wherein the position-dependent grating constant of the scanning graduation corresponds to an inverse of the frequency distribution:

$$g_A(x) := \frac{1}{2\cdot\pi} \cdot \frac{d}{dx}\phi(x)$$

in which φ(x) represents the position-dependent phase at the scanning graduation.

6. The position-measuring device according to claim 1, wherein the detector surface of the detector includes a periodic arrangement of detector regions arranged one after the other along a detector axis, a period of the periodic arrangement tuned to a period of a stripe pattern to be detected by the detector.

7. The position-measuring device according to claim 6, wherein the detector regions include detector elements.

8. The position-measuring device according to claim 7, wherein the detector elements include photosensors.

9. The position-measuring device according to claim 1, wherein the detector includes a planar, substantially two-dimensional detector surface.

10. The position-measuring device according to claim 1, wherein at least one of (a) the measuring graduation and (b) the scanning graduation includes an amplitude grating.

11. The position-measuring device according to claim 1, wherein the scanning graduation includes a MAP grating.

12. The position-measuring device according to claim 1, wherein the electromagnetic radiation includes collimated light.

13. The position-measuring device according to claim 1, wherein the measuring graduation is arranged on a measuring strip arranged in ring fashion on a rotatable drum.

14. The position-measuring device according to claim 1, wherein the measuring graduation is arranged directly on a surface of a rotatable drum.

15. The position-measuring device according to claim 1, wherein the grating constant decreases in the at least one spatial direction along the axis of extension of the scanning graduation starting from the reference point in accordance with a projection of the measuring graduation onto the axis of extension of the scanning graduation.

16. A position-measuring device comprising:
a measuring graduation arranged around a measuring standard device in a ring manner; and
a scanning unit adapted to optically scan the measuring graduation with electromagnetic radiation, the scanning unit including a scanning plate having a scanning graduation formed by a scanning grating extending along an axis of detection that is arranged in a beam path of the electromagnetic radiation so that the electromagnetic radiation interacts with the scanning graduation and the measuring graduation, the scanning unit including a detector having a detector surface adapted to detect electromagnetic radiation present after the interaction with the scanning graduation and the measuring graduation to record motions of the measuring standard device relative to the scanning unit;
wherein a grating constant of the scanning graduation decreases in at least one spatial direction along an axis of extension of the scanning graduation starting from a reference point; and
wherein the grating constant of the scanning graduation, along the axis of extension of the scanning graduation, varies such that distances, on which a phase of an intensity distribution of the electromagnetic radiation that is present at the detector surface in a stripe pattern changes by 2π, are constant.

17. The position-measuring device according to claim 2, wherein the grating constant of the scanning graduation decreases in two spatial directions that are opposite to one another and extend along the axis of extension of the scanning graduation starting from a reference point.

18. The position-measuring device according to claim 17, wherein the decrease of the grating constant of the scanning graduation along the two opposite directions is symmetric with respect to the reference point.

19. The position-measuring device according to claim 2, wherein a position-dependent grating constant of the scanning graduation is dependent on a position dependence of a grating phase of the scanning graduation, which is derived from a position-dependent grating phase of the measuring graduation, projected onto the axis of extension of the scanning graduation, and from a prespecifiable position-dependent phase of a desired stripe pattern of the electromagnetic radiation at the detector surface.

20. The position-measuring device according to claim 19, wherein the position-dependent grating constant of the scanning graduation corresponds to an inverse of the frequency distribution:

$$g_A(x) := \frac{1}{2\cdot\pi} \cdot \frac{d}{dx}\phi(x)$$

in which φ(x) represents the position-dependent phase at the scanning graduation.

21. The position-measuring device according to claim 2, wherein the detector surface of the detector includes a periodic arrangement of detector regions arranged one after the other along a detector axis, a period of the periodic arrangement tuned to a period of a stripe pattern to be detected by the detector.

22. The position-measuring device according to claim 21, wherein the detector regions include detector elements.

23. The position-measuring device according to claim 22, wherein the detector elements include photosensors.

24. The position-measuring device according to claim 2, wherein the detector includes a planar, substantially two-dimensional detector surface.

25. The position-measuring device according to claim 2, wherein at least one of (a) the measuring graduation and (b) the scanning graduation includes an amplitude grating.

26. The position-measuring device according to claim 2, wherein the scanning graduation includes a MAP grating.

27. The position-measuring device according to claim 2, wherein the electromagnetic radiation includes collimated light.

28. The position-measuring device according to claim 2, wherein the measuring graduation is arranged on a measuring strip arranged in ring fashion on a rotatable drum.

29. The position-measuring device according to claim 2, wherein the measuring graduation is arranged directly on a surface of a rotatable drum.

30. The position-measuring device according to claim 2, wherein the grating constant decreases in the at least one spatial direction along the axis of extension of the scanning graduation starting from the reference point in accordance with a projection of the measuring graduation onto the axis of extension of the scanning graduation.

* * * * *